United States Patent [19]

Gross

[11] Patent Number: 5,456,212
[45] Date of Patent: Oct. 10, 1995

[54] ANIMAL FLUID APPLICATOR

[76] Inventor: Jonathon Gross, Box 248, Rockyford, Alberta, Canada, T0J 2R0

[21] Appl. No.: 297,026

[22] Filed: Aug. 29, 1994

[51] Int. Cl.[6] .................................................. A01K 13/00
[52] U.S. Cl. ............................................................ 119/157
[58] Field of Search ............................. 119/157; 118/76, 118/78; 222/187

[56] References Cited

U.S. PATENT DOCUMENTS

| | | | |
|---|---|---|---|
| 2,810,369 | 10/1957 | Assman et al. | 119/157 |
| 3,137,274 | 6/1964 | Palmer | 119/157 |
| 3,285,231 | 11/1966 | Johnson | 119/157 |
| 3,295,502 | 1/1967 | Muhe | 119/157 |
| 3,960,114 | 6/1976 | Hovorak | 119/157 |
| 5,255,633 | 10/1993 | Laurenz | 119/157 |

*Primary Examiner*—Todd E. Manahan

[57] ABSTRACT

A free-standing animal fluid applicator comprises a frame constructed from pipe and having two spaced apart upright members. Two mechanism support hanging arms are pivotally attached to upper end portions of the upright members. The height of the hanging arms are adjustable to accommodate different sizes of animals. A reservoir extends between the hanging arms. The bottom of the reservoir has two downwardly directed valves. Below the valves is an open trough having a cotton material hanging therefrom. When an animal passes through the cotton material, it pulls a chain which id guided to pull down on an exterior end portion of rocker arm. The interior end portion of the rocker arm lifts one end of a valve closure member. The other end of the valve closure member moves downwardly opening the valve. The valve closure member includes an adjustable counterweight. Adjustment of the counterweight regulates fluid flow through the valve. Fluid in the reservoir then runs down through the valve and into the trough. It then soaks the cotton material which rubs the animal applying fluid thereto.

18 Claims, 3 Drawing Sheets

ANIMAL FLUID APPLICATOR

BACKGROUND OF THE INVENTION

This invention relates to apparatuses used to apply fluid to animals and particularly fluid insecticides to the coats of cattle.

In the mid to late summer it is necessary to oil the coats of cattle and especially milking cows to minimize the problem they have with biting insects. Because the application of insecticides to an irregularly shaped animal is a laborious process which must be undertaken on a regular basis for a substantial number of animals, a number of mechanisms have been devised to assist farmers and ranchers.

One such mechanism is described in U.S. Pat. No. 5,255,633 granted to F. P. Laurenz. His invention oils animals which pass under a sloping rope. A reservoir and valve means apply fluid to the rope when it is pulled. The problem with this invention is that the animal must passed be under the rope a number of times and even then, coverage is partial and uneven. This mechanism is also limited to a small number of animals because all fluid dispersed must permeate down a single rope. Flow is poorly regulated and fluid frequently drops onto the ground.

Another mechanism, described in U.S. Pat. No. 3,285,231 granted to B. Johnson describes a canvas blind having cotton ropes descending thereunder. The blind is suspended from a valve beneath a reservoir. When an animal passes thereunder, the blind is lifted and a valve is opened wetting the blind. One problem with this mechanism is that the fluid is applied most heavily directly beneath the valve. Another problem is that it is difficult to regulate fluid flow. Fluid is wasted; it frequently drops from the blind onto the ground.

OBJECTS AND STATEMENT OF THE INVENTION

It is an object of this invention to provide a mechanism which will apply fluid evenly to an animal passing thereunder. It is an object of this invention to provide a mechanism which can service a large number of animals. It is an object of this invention to provide a free-standing mechanism which can be conveniently positioned in an open passage or in front of an open doorway. It is yet a further object of this invention to provide a mechanism which can readily be adjusted to dispense and apply the correct amount of fluid as each animal passes therethrough.

One aspect of this invention provides for an animal fluid applicator comprising a frame having spaced opposite upright members; a base supporting the upright members; a reservoir carried between an upper end portion of the upright members; a valve in communication with the reservoir having an opening surrounded by a valve seat, said valve carried by the reservoir; a valve closure member having a mid portion pivotally carried by the frame and a first end matingly fitted to the valve seat; a rocker arm having a mid portion pivotally carried by the frame and an interior end portion configured to move a second end of the valve closure member; bias means configured to maintain the valve closure member in a closed position; linear pull guide means positioned below the rocker arm and carried by the frame; linear pull means having one end attached to the exterior end portion of the rocker arm and extending downwardly through the guide means then between the upright members so that when the linear pull means is pulled the exterior end portion of the rocker arm moves downwardly, the interior end portion moves upwardly, the second end of the valve closure member moves upwardly and the valve seat is opened allowing fluid to flow therethrough.

A preferred embodiment of this invention provides for two mechanism support hanging arms, said arms having an upper end portion pivoted to the upper end portion of an upright member, said hanging arms carrying a reservoir extending between the upright members. A valve beneath and in communication with the reservoir extends beneath the reservoir. A closure member moved by a rocker arm maintains the valve in a closed position except when a chain is pullrd opening the valve. A trough is positioned beneath the valve collects fluid when the valve is opened. Cotton material hangs from the trough to apply the collected fluid to an animal passing through the Animal Fluid Applicator.

Various other objects, advantages and features of this invention will become apparent to those skilled in the art from the accompanying drawings.

FIGURES OF THE INVENTION

Figure 1:
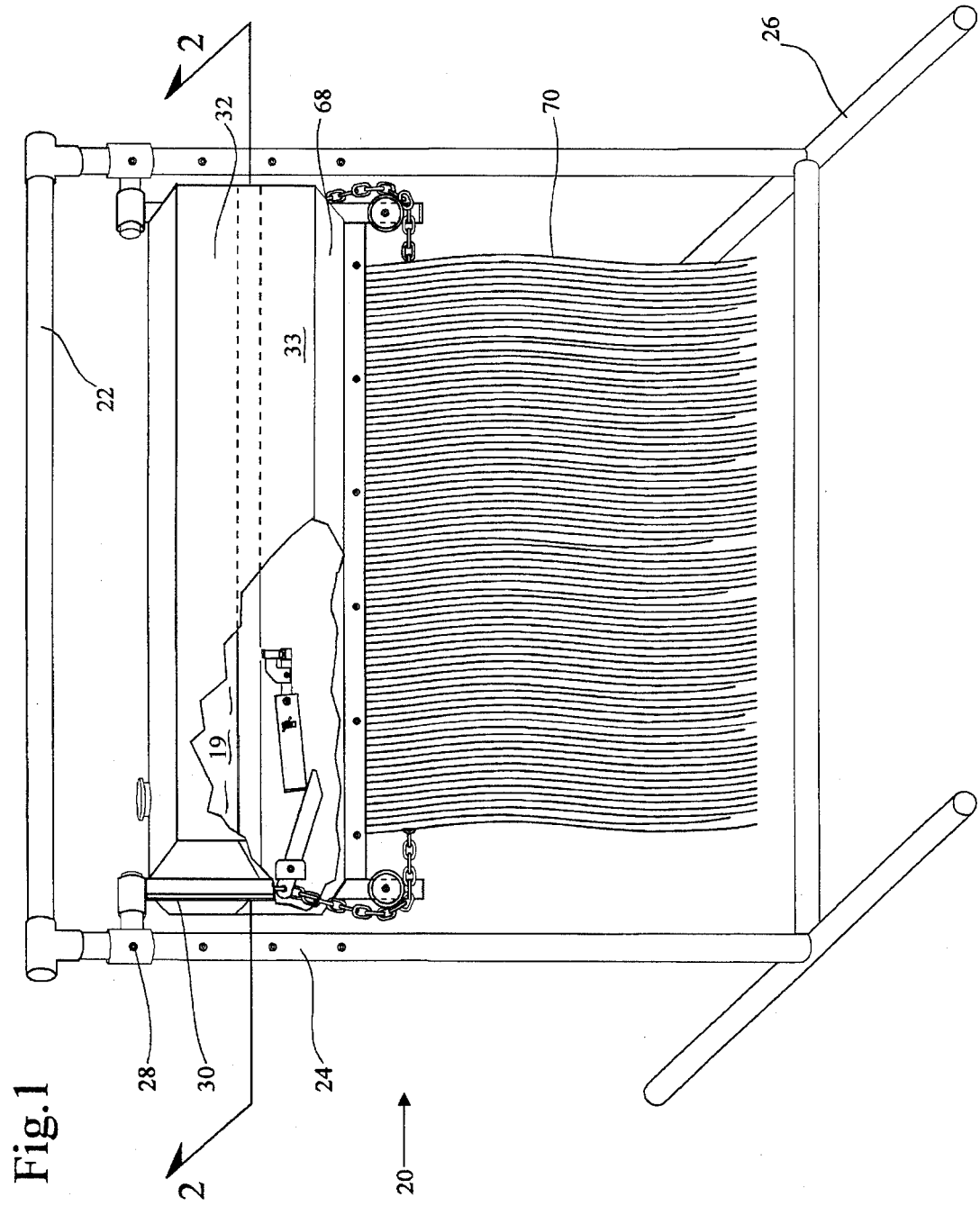
FIG. 1 is a perspective view of the invention.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings, and more particularly FIG. 1, we have a perspective view of the Animal Fluid Applicator 20. The Applicator 20 can be used to apply any type of fluid 19 to any size of animal. The Applicator 20 comprises a frame 22 having spaced opposite upright members 24 which are supported by a base 26. Two mechanism support hanging arms 30 have upper end portions which are pivoted to the upper end portion of the upright members 24. The upright members 24 have holes 28 therethrough so that the height of the hanging arms 30 may be varied to best accommodate differently sized livestock. Said hanging arms 30 carry a 20-gallon reservoir 32 which extends therebetween. Two valve bodies 34 have a male internal pipe thread on a top end portion (not shown) and are screwed upwardly into the reservoir 32. A skirt 33 covers the valve body on the right side of the reservoir in FIG. 1. A lower end portion of the valve body comprises a valve 34 having a 3/16" orifice opening downwardly.

Figure 2:
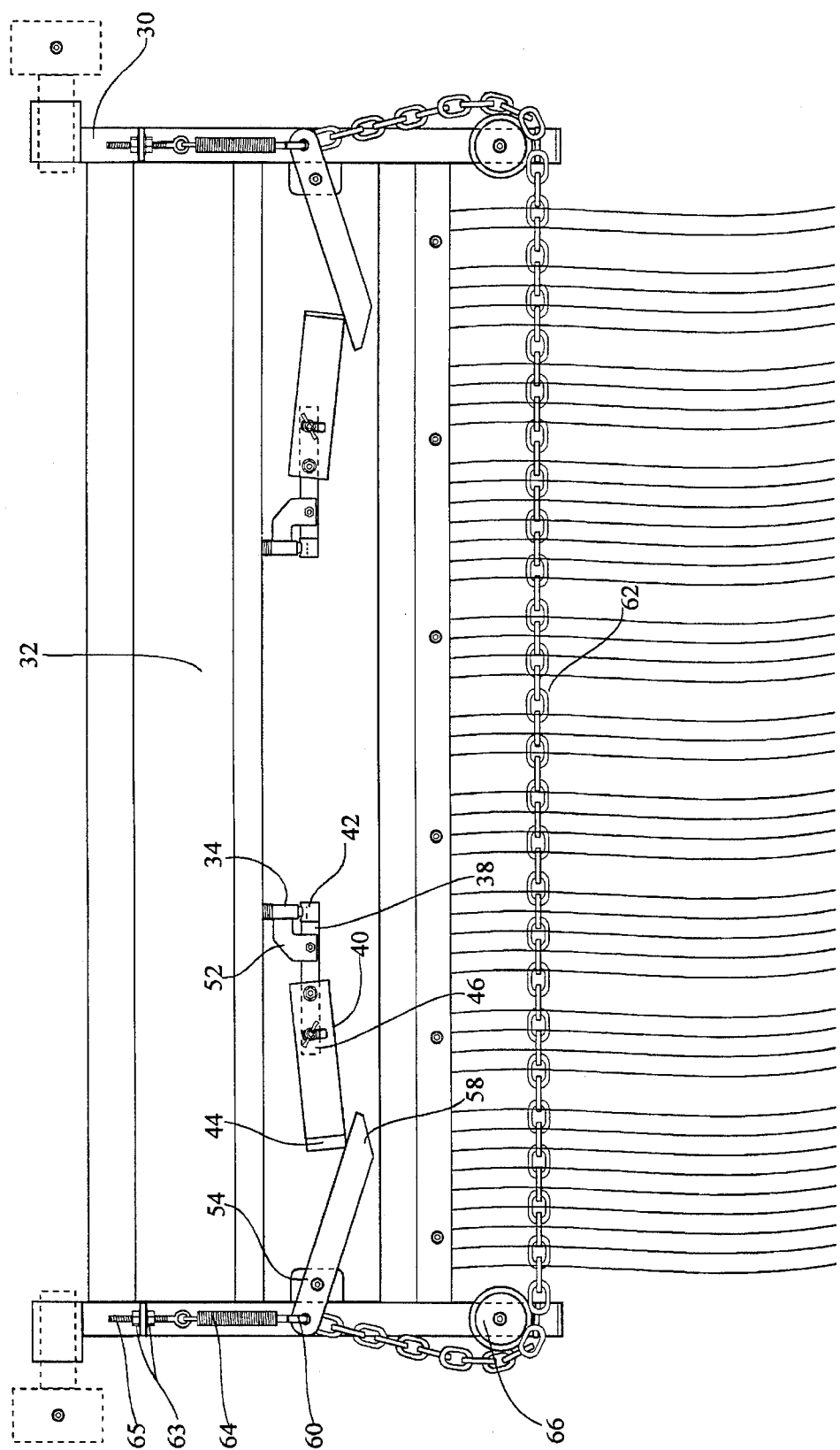
FIG. 2 is a broken away diagrammatic view of the mechanism support hanging arms, the reservoir and the mechanism supported thereby. A portion of the trough is broken away to expose the mechanism.

Looking at FIG. 2 we see a valve closure member 38 having a mid portion 40 which is pivotally carried by the frame 22. In the preferred embodiment the valve closure member 38 is pivoted to a pivot arm 52 which extends from the valve body 34, which is carried by the reservoir 32, which is carried by the hanging arms 30, which in turn are carried by upright members 24 of the frame 22.

A rocker arm 54 has a mid portion pivotally carried by the frame 22. An interior end portion 58 rests beneath the adjustable counter-weight 44 which is connected to the valve closure member 38. An exterior end portion 60 of the rocker arm 54 is connected to a linear pull means which is preferably a chain 62 and a tension adjustment mechanism which comprises a bias means which is preferably a cylindrical spiral spring 64, a threaded rod 65 and a pair of nuts 63. The spring 64 pulls upwardly on the exterior end portion 60 of the rocker arm 54 so that the chain 62 is maintained in a taut horizontal position. When the chain is pulled the interior end portion 58 of the rocker arm 54 is lifted; this lifts the counter-weight 44 screwed to the second end portion 46 of the valve closure member 38 which in turn causes the first end portion 42 thereof to unseat on the valve seat 36 so that fluid 19 is allowed to flow therethrough.

The chain 62 extends downwardly from the exterior end portion of the rocker arm 54 around the outside of a linear pull guide means, which preferably is a pulley 66; and then it extends horizontally across to the other hanging arm 30 where it is similarly configured with respect to a second pulley 66 and a second rocker arm 54. In an alternative embodiment (not shown) the chain 62 extends horizontally across to the other hanging arm 30 where it is anchored thereto. The Applicator 20 has only one valve, one valve closure member 38, one rocker arm 54 and one pulley 66.

An open trough 68 extends between the hanging arms 30 below the rocker arms 54 to catch any fluid 19 flowing through the valve seats 36. The bottom of the trough 68 is "V"-shaped; and at the point of the "V" a 5/32" hole is drilled every 10 cm. On the outside of the trough 68 applicator material, which is preferably cotton 70, is held in place by a clamp (not shown) that is welded to the whole length of the trough 68.

Figure 3:
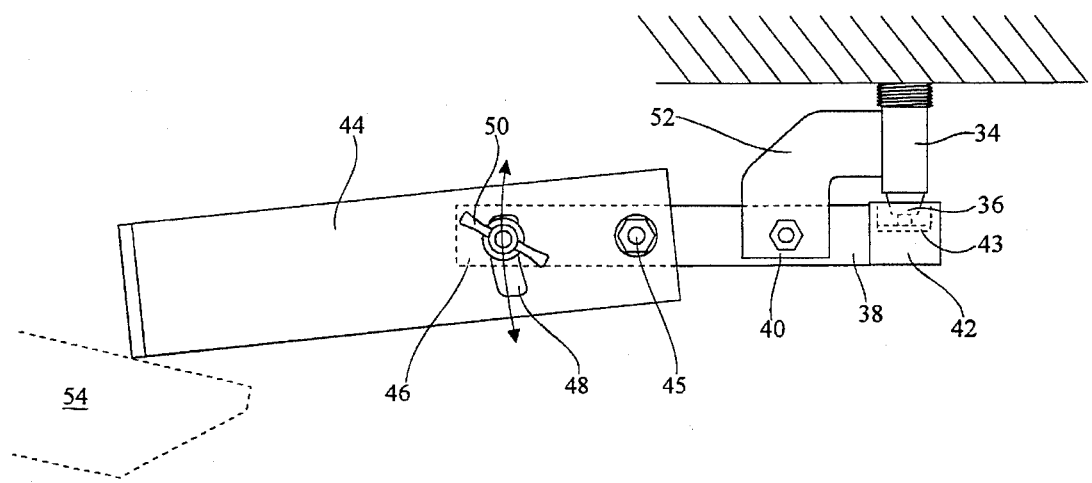
FIG. 3 is an enlarged view of a portion of the mechanism in a closed position.

Looking at FIG. 3, the valve closure member 38 has a first end portion 42 with a rubber seat 43 mating fitted to the valve seat 36; a second end portion thereof has an adjustable counter weight 44 held thereto by bolts 45. The adjustable counter-weight 44 includes an elongated bolt hole 48 therethrough to which it is adjustably screwed to the second end 46 of the valve closure member 38 using a wing nut 50.

Figure 4:
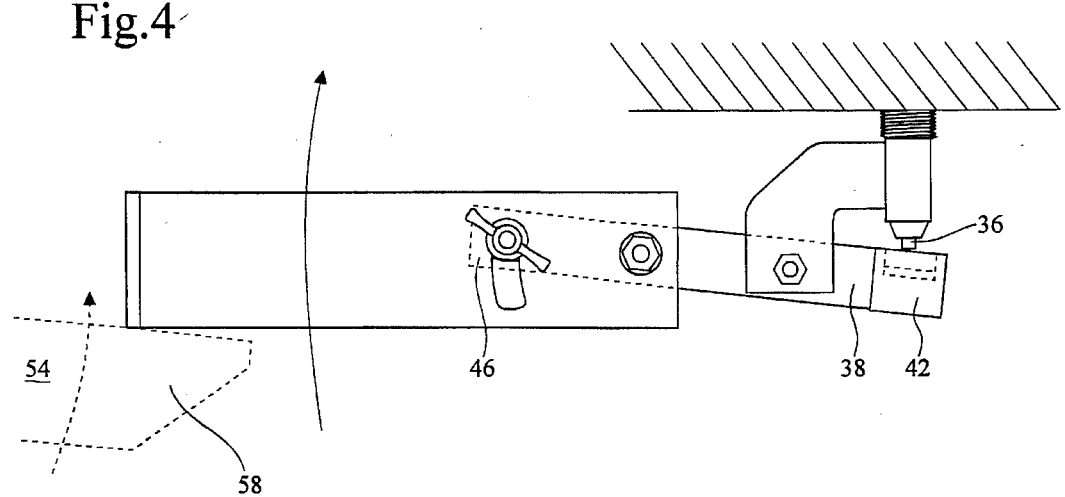
FIG. 4 is an enlarged view of a portion of the mechanism in an open position when the chain has been pulled.

FIG. 4 illustrates the operation of the Animal Fluid Applicator 20. When an animal, such as a cow (not shown) passes through the Applicator 20 it lifts the chain 62. This rocks the rocker arm 54 lifting the interior end portion 58 thereof upwardly. The second end portion 46 of the valve closure member 38 is lifted. The first end portion 42 thereof is thereby rotated downwardly, unseating the valve closure member 38 from the valve seat 36 allowing fluid 19 to flow therethrough. The fluid 19 is caught by the trough 68. It is then soaked up by the cotton 70 and in turn applied to the animal.

The foregoing description of the invention has been described with preferred specific embodiments thereof. This description is intended to illustrate, and not to limit the scope of the invention. It will be evident that there are a number of changes, adaptions and modifications of the present invention which come to mind and are within the province of the skilled in the art. It is intended that all such variations not departing from the spirit of the invention be considered as within the scope thereof as limited solely by the claims appended hereto.

I claim:

1. An animal fluid applicator comprising:

a frame having spaced opposite upright members;

a base supporting the upright members;

a reservoir carried between an upper end portion of the upright members;

a valve in communication with the reservoir, said valve having an opening surrounded by a valve seat, said valve carried by the reservoir;

a valve closure member having a mid portion pivotally carried by the frame and a first end matingly fitted to the valve seat;

a rocker arm having an interior end portion, an exterior end portion, and a mid portion, said mid portion pivotally carried by the frame and an interior end portion configured to move a second end of the valve closure member;

bias means configured to maintain the valve closure member in a closed position;

linear pull guide means positioned below the rocker arm and carried by the frame;

applicator means in communication with said valve; and linear pull means having one end attached to the exterior end portion of the rocker arm and extending downwardly through the guide means then between the upright members so that when the linear pull means is pulled the exterior end portion of the rocker arm moves downwardly, the interior end portion moves upwardly, the second end of the valve closure member moves upwardly, the valve seat is opened allowing fluid to flow therethrough, and the applicator means is wetted with fluid.

2. An applicator as in claim 1 wherein the applicator means is a trough extending between the upright members and applicator material extending downwardly from the bottom of the trough between the upright members.

3. An applicator as in claim 2 wherein the valve has a valve body having a top end portion in communication with the reservoir and a bottom end portion having an opening surrounded by the valve seat.

4. An applicator as in claim 3 wherein the linear pull means is a chain.

5. An applicator as in claim 4 wherein the linear pull guide means is a pulley.

6. An applicator as in claim 5 wherein the bias means is a cylindrically spirally coiled spring.

7. An applicator as in claim 6 wherein the chain is attached to the exterior end of the rocker arm and extends downwardly and the spring is also attached to the exterior end of the rocker arm and extends upwardly.

8. An applicator as in claim 7 further comprising a tension adjustment mechanism attached to a top end of the spring.

9. An applicator as in claim 8 wherein the tension adjustment mechanism comprises a threaded rod and a pair of matingly threaded nuts.

10. An applicator as in claim 9 further comprising a second valve body, a second closure member, a second rocker arm, a second tension mechanism, an a second pulley configured on an opposite side of the frame and operated by the chain.

11. An applicator as in claim 10 wherein the applicator material is cotton.

12. An applicator as in claim 9 further comprising two mechanism support hanging arms, said arms having an upper end portion pivoted to the upper end portion of an upright member, said hanging arms carrying the reservoir, the valve body, the closure member, the rocker arm, the trough, the pulley, the chain and the applicator material.

13. An applicator as in claim 12 wherein the frame is constructed from pipe.

14. An applicator as in claim 13 wherein the height of the upper end portion of the hanging arm pivoted to the upper end portion of the upright member may be adjusted to better accommodate differing heights of animals.

15. An applicator as in claim 14 wherein the applicator material is cotton.

16. An applicator as in claim 1 wherein a second end o the valve closure member rests on the interior end of the rocker arm so that when the interior end moves upwardly the second end is lifted.

17. An applicator as in claim 16 further comprising a counterweight connected to the second end of the valve closure member which is lockingly rotatable with respect to the valve closure member to facilitate adjustment of the opening between the valve seat and valve closure member when the chain is pulled.

18. An applicator as in claim 17 wherein the counterweight further comprises an elongated hole having a bolt therein with a wing nut thereon for locking adjustment thereof to the second end of the valve closure member.

* * * * *